US009450840B2

(12) United States Patent
Denis

(10) Patent No.: US 9,450,840 B2
(45) Date of Patent: Sep. 20, 2016

(54) DOMAIN CLASSIFICATION USING DOMAIN CO-OCCURRENCE INFORMATION

(71) Applicant: Cisco Technology, Inc., San Jose, CA (US)

(72) Inventor: Frank Denis, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 496 days.

(21) Appl. No.: 13/938,983

(22) Filed: Jul. 10, 2013

(65) Prior Publication Data

US 2015/0019708 A1  Jan. 15, 2015

(51) Int. Cl.
*G06F 15/173* (2006.01)
*G06F 15/16* (2006.01)
*H04L 12/26* (2006.01)
*H04L 29/06* (2006.01)
*H04L 29/12* (2006.01)

(52) U.S. Cl.
CPC ........... *H04L 43/04* (2013.01); *H04L 63/1425* (2013.01); *H04L 61/1511* (2013.01); *H04L 63/145* (2013.01); *H04L 2463/144* (2013.01)

(58) Field of Classification Search
CPC ............... H04L 43/04; H04L 63/1425; H04L 61/1511; H04L 63/145; H04L 2463/144
USPC .................................................. 709/204, 224
See application file for complete search history.

(56) References Cited

U.S. PATENT DOCUMENTS

| 6,285,999 | B1 | 9/2001 | Page |
| 6,799,176 | B1 | 9/2004 | Page |
| 7,058,628 | B1 | 6/2006 | Page |
| 7,269,584 | B2 | 9/2007 | Settle, III |
| 7,457,823 | B2 | 11/2008 | Shraim et al. |
| 7,870,608 | B2 | 1/2011 | Shraim et al. |
| 7,991,710 | B2 | 8/2011 | Palatucci et al. |
| 8,321,935 | B1 | 11/2012 | Chen et al. |
| 8,448,245 | B2 | 5/2013 | Banerjee et al. |
| 2007/0198603 | A1 | 8/2007 | Tsioutsiouliklis et al. |
| 2009/0077383 | A1 | 3/2009 | de Monseignat et al. |
| 2009/0313502 | A1 | 12/2009 | Jeong et al. |
| 2010/0100929 | A1 | 4/2010 | Bae et al. |

(Continued)

OTHER PUBLICATIONS

Katzumichi, Sato et al. "Extending Black Domain Name List by Using Co-occurrence Relation Between DNS Queries," IEICE Transactions on Communications, Communications Society, Tokyo, JP, vol. E95B, No. 3, Mar. 2012, pp. 794-802.*

(Continued)

*Primary Examiner* — Melvin H Pollack

(57) ABSTRACT

Domain classification based on domain co-occurrence information derived from client request behavior is provided. The network requests of clients are analyzed to determine domain and time information. Distance information is generated based on the time between requests for a plurality of domains. The distance information for individual clients is combined to generate distance information for domain pairs. The distance information represents an amount of time or other measurement between queries associated with the two domains of the pair. By examining the client requests, a measure of the distance or relatedness of two domains may be determined. Co-occurrence information for a first set of domains is generated based on the co-occurrence of domains in the first set with domains in a second set of domains. Based on the co-occurrence information, a domain classification can be generated for domains in the first set of domains.

24 Claims, 9 Drawing Sheets

(56) References Cited

U.S. PATENT DOCUMENTS

| | | |
|---|---|---|
| 2010/0145771 A1 | 6/2010 | Fligler et al. |
| 2012/0005753 A1 | 1/2012 | Provos et al. |
| 2012/0023568 A1 | 1/2012 | Cha et al. |
| 2012/0054869 A1 | 3/2012 | Yen et al. |
| 2012/0066203 A1 | 3/2012 | Robert |
| 2013/0014253 A1 | 1/2013 | Neou et al. |

OTHER PUBLICATIONS

Zhiwen Wang et al. "Co-occurence Relation of DNS Queries Based Research on Botnet Activities," Journal of Networks, vol. 7, No. 5, May 2012, pp. 856-862.*

Creighton, T. et al. :DNS Redirect for Protection from Maleware, IETF Standard, No. 2, Oct. 22, 2010, pp. 1-21.*

U.S. Appl. No. 13/750,712, filed Jan. 25, 2013.

Sato, Kazumichi, et al., "Extending Black Domain Name List by Using Co-occurrence Relation between DNS Queries," IEICE Transactions on Communications, Communications Society, vol. E95B, No. 3, Mar. 1, 2012, 8 pages.

Enright, Brandon, "Tracking Malicious Activity with Passive DNS Query Monitoring," Cisco Blog, Oct. 17, 2012, Retrieved from the Internet on Jul. 25, 2014: [http://blogs.cisco.com/security/tracking-malicious-activity-with-passive-dns-query-monitoring/], 10 pages.

International Search Report & The Written Opinion of the International Searching Authority dated Oct. 17, 2014, International Application No. PCT/US2014/045792.

Wang, Zhiwen et al., "Co-occurrence Relation of DNS Queries Based Research on Botnet Activities," Journal of Networks, vol. 7, No. 5, May 2012, pp. 856-862.

Lee, Jehyun et al., "Tracking multiple C&C botnets by analyzing DNS traffic," 6th IEEE Workshop on Secure Network Protocols (NPSEC), Oct. 2010, pp. 67-72.

Creighton, T., et al., "DNS Redirect for Protection from Malware," draft-livingood-dns-malwareprotect-02.txt, IETF, Oct. 22, 2010, 22 pages.

* cited by examiner

DOMAIN CLASSIFICATION USING DOMAIN CO-OCCURRENCE INFORMATION

BACKGROUND OF THE INVENTION

1. Field of the Invention

Embodiments in accordance with the present disclosure relate to computer networks, and particularly to security in computer networks.

2. Description of the Related Art

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The domain name system facilitates the translation between IP addresses and domain names by maintaining accessible records that associate one or more domain names with one or more IP addresses.

Malware such as computer viruses, Trojan horses, worms, botnets and the like is often distributed over the Internet as or with network resources. Numerous anti-malware products exist that detect, block and/or remove malware from devices. Over time, particular domain names may become associated with the distribution of malware. So-called block lists have been developed that list domains associated with malware. Domains may be identified for placement on a block list in numerous ways. For example, researchers can retrieve network resources and analyze the content of the resource for the presence of malware. Similarly, software can analyze the content of network resources to detect the presence of malware. Once identified, these domain names can be added to a block list and published for use by network devices. A client device or network router may block the transfer of content from a domain on a block list for example.

DETAILED DESCRIPTION

Figure 1:
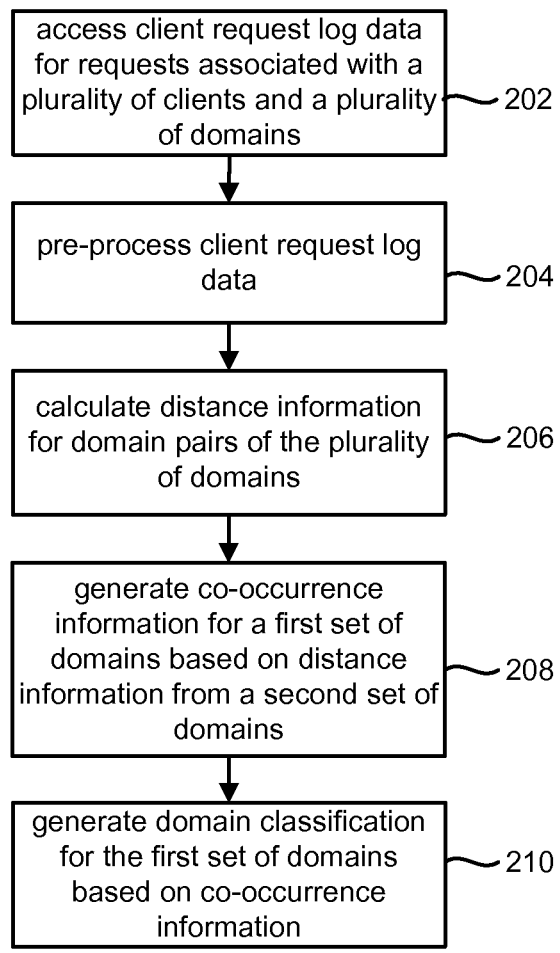
FIG. 1 is a flowchart describing a method of generating classification information based on domain co-occurrence information.

Systems and methods for domain classification based on domain co-occurrence information derived from client request behavior are provided. The network requests of a plurality of clients are analyzed to determine domain and time information corresponding to each network request. The information can be used to associate a set of domain requests with each client. For each client, distance information is generated based on the time between requests for individual domains of a plurality of domains. The distance information for each client is combined to generate distance information for pairs of domains. The distance information for each domain pair represents an amount of time or other distance measurement between queries associated with the two domains of the pair across queries from the plurality of clients. In this manner, a relationship of the two domains based on client request behavior is generated. Domains that are associated with requests from a single client near in time may be more related than domains that are not associated with requests that are near in time. By examining the requests of a plurality of clients, a measure of the distance between or relatedness of two domains of a domain pair may be determined. For example, the combined measure may represent the time between requests for the two domains across a group of clients.

Within the plurality of domains, there may exist a first set of known domains having a classification and a second set of unknown domains having no classification. In one embodiment, the domain pairs include one domain from the first set of domains and one domain from the second set of domains, although in such cases domain pairs can also include domain pairs formed within the first set of domains and/or domain pairs formed within the second set of domains. Co-occurrence information for the first set of domains can be generated based on the co-occurrence of requests for domains in the first set of the domains with requests for domains in the second set of domains. The co-occurrence information includes a score for a selected domain in the first set based on the distance information for each domain pair including the selected domain. Based on the co-occurrence information, a domain classification can be generated for domains in the first set of domains.

Client devices that are infected with malware may frequently send requests to domains that are associated with malware. These domains may be referred to as malicious or suspicious domains for convenience. Generally, these terms refer to any domain that is associated with malware or some sort of suspicious activity. The domain may be associated with the distribution of the malware, the collection of data from malware at client devices or in any other way affiliated with malicious activity or code. For example, a virus may collect data at a client device and forwarded it to a malicious domain for processing. A client device that has been infected with malware may not have malware protection such as anti-malware software and thus, may issue requests to other malicious domains.

The system may access block list or other information indicating domains that are associated with malware, viruses, or other malicious content or behavior. These domains can be considered pre-classified as the system already contains some classification information relating to the domains. The block list or other classification of a set of the plurality of domains can then be used to examine the distance between unknown domains and the set of domains having a classification. For each unknown domain, the system can combine the distance information for each domain pair including the unknown domain and a domain from the set of known domains. In this manner, a measure of the co-occurrence of the unknown domain with domains having the pre-existing classification is generated. If the measure is outside of a threshold in one example, the unknown domain can be classified with the set of known domains based on its measured relatedness to the set of known domains.

FIG. 1 is a flowchart describing a process for generating domain classifications based on domain co-occurrence information derived from client request behavior in accordance with one embodiment of the disclosed technology. While not limited to any particular example, the described process may be implemented using domain name system request information associated with a plurality of clients and a plurality of domains. The process may additionally or alternately be implemented using resource-level request information, such as client HTTP requests for resources from target domains. Moreover, the domain classifications may be used in DNS processing or resource-level processing as described more fully hereinafter.

At step 202, client request log data is accessed. The log may include a table of DNS requests in one example. The table may include for each DNS request, the source IP addresses, the target domain name of the DNS request, and a time associated with the request, such as when the DNS request was received. The log may additionally or alternately include a table of resource-level requests, again containing source IP address, target domain name information, and time information. While not so limited, it is noted that the log data may contain information for many different clients and many different domains. In this manner, the amount of data may better lead to convergence of accurate and stable co-occurrence information as described hereinafter.

At step 204, the client request log data is optionally pre-processed for determining co-occurrence information. In one example, step 204 includes accessing time segments of the request log data for further processing, such as a time slice (e.g., one hour) over a number of days. Additionally, when the log data includes multiple domain requests from a single client address, one or another number less than all of the requests may be used. For example, the client address requests of the domain pair having the oldest timestamps may be used in one example. In another example, step 204 includes discarding the DNS request log data for client addresses having a number of DNS requests that exceeds the number of DNS requests for a predetermined number of other client addresses. For example, client addresses that have a number of DNS requests that is more than the DNS requests of 99% of other client addresses may likely be associated with universities, corporations, government agencies, or other large groups of clients having a single client address. Because the client address doesn't represent a single client but more likely the requests of many users, it may be discarded to avoid undue influence on the model. Other pre-processing operations of the data may be performed.

At step 206, distance information for pairs of domains is generated based on the client request log data. Each domain pair includes two domains. In one embodiment, the distance information for a domain pair is based on the time difference of the requests from a client. For each client, the time difference between a request for the first domain of the pair and a request for the second domain of the pair can first be determined. The time differences for each client can then be combined to generate distance information such as a distance score for the domain pair. Various constraints or filters on the data may be used. For example, if a classification for a first set of domains is being determined based on co-occurrences with a second set of already classified domains, the distance information may be limited to instances where a client issues a request for a domain in the second set of domains after issuing a request for a domain in the first set of domains. This may be useful for detecting domains associated with malicious activity. In many cases, client devices are redirected or driven to malicious domains by seemingly benign domains that have been compromised. Thus, it may useful to limit examination to those domains requested before a request for a malicious domain to detect such activity. Furthermore, it may be useful to limit examination to distance information that is within a certain threshold of time. For example, requests that are far apart in time may be assumed to be unrelated and their data not examined. Nevertheless, the domain pairs may be formed of domains within a single grouping and used for various calculations as described herein.

At step 208, co-occurrence information is generated for a first set of domains based on the distance information for domain pairs from step 206. Step 208 may include for each domain in the first set, determining co-occurrence information based on co-occurrences with a second a second set of domains. The distance information for each domain pair including the selected domain and a domain from the second set of domains can be used in one example. The co-occurrence information represents the relationship or relatedness of a selected domain in the first set of domains with the second set of domains, based on the distance between the selected domain and the domains in the second set. In this manner, the co-occurrence information can provide a measure of the co-occurrences for requests for a selected domain and requests for a set of malicious domains, for example.

At step 210, a domain classification is determined for unknown domains or unclassified domains based on the co-occurrence information for the unknown domain. Various thresholds or other techniques may be used at step 210. For example, a low security threshold may be established and a high security threshold may be established. If a domain has a co-occurrence score above a first security threshold it may be added to a block list or otherwise denoted as being suspicious or associated with malware. If a domain has a co-occurrence score below a second threshold, it may be white listed or otherwise denoted as being safe and not associated with malware. If a domain has a co-occurrence score between the thresholds it may remain unclassified. Other examples may include providing various levels of domain classifications based on the actual co-occurrence score. This technique may provide additional information as to the level of security threat a particular domain may pose. As will be described hereinafter, the domain classifications can be used to route DNS requests or resource level requests.

Figure 2:
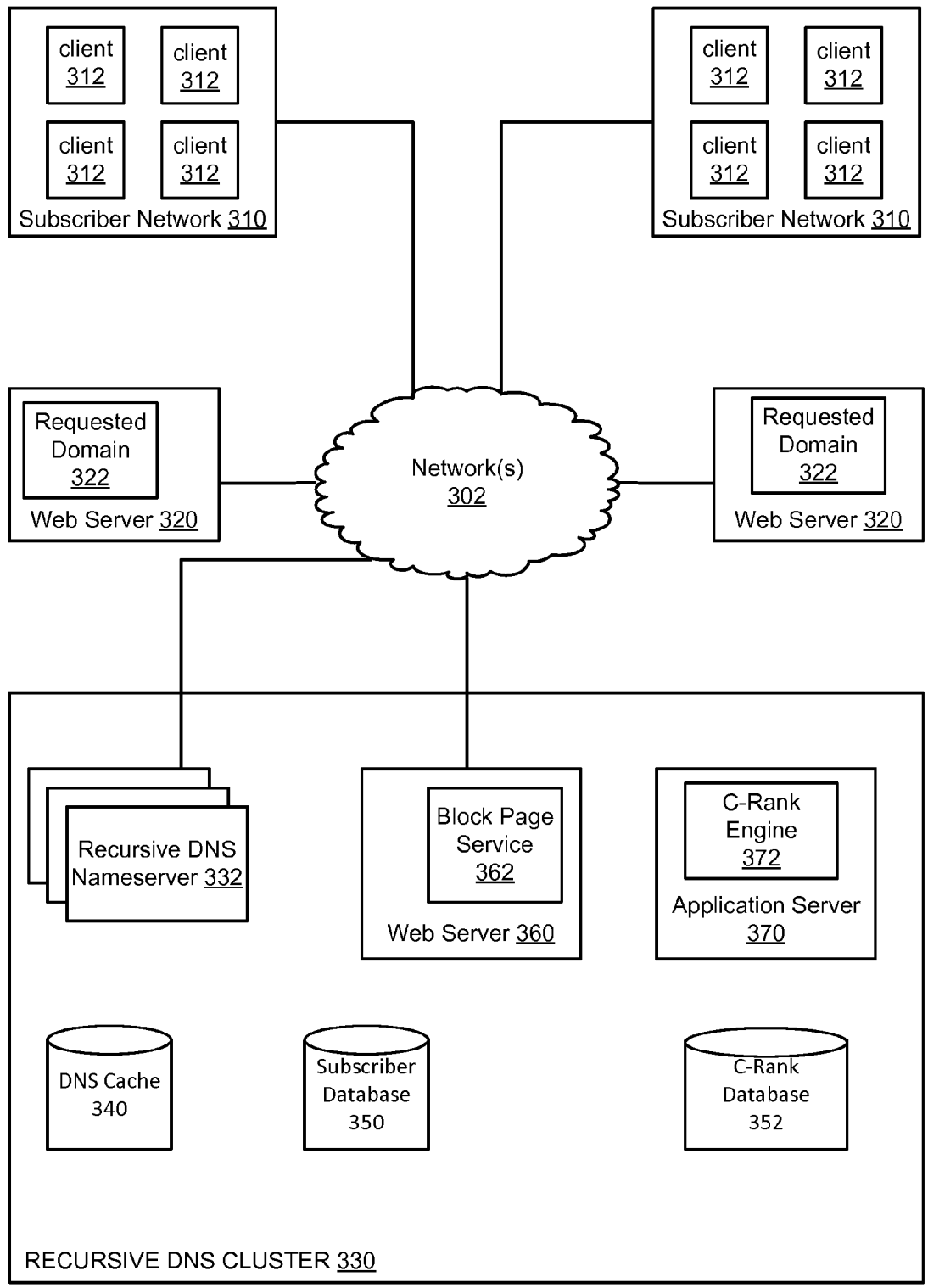
FIG. 2 is a block diagram of a computer network describing the generation and use of domain co-occurrence information based on network request behavior in accordance with one embodiment.

FIG. 2 is a block diagram of a system depicting an example of an implementation of the disclosed technology for domain classification that is used in processing DNS requests and/or resource level requests. Subscriber networks 310, web servers 320 and a recursive DNS cluster 330 are each in communication with one or more network(s) 302.

Network(s) 302 and 310 can include any combination of local area networks, wide area networks (WAN), the Internet, and/or any other network. The recursive DNS clusters can vary by implementation and include any suitable computing system such as a server, group, grid, or distributed platform of computer systems configured to respond to requests for domain name information. While the cluster in FIG. 2 is depicted with multiple recursive DNS nameservers, other embodiments may include a single computing system within a cluster such as a single server. The individual recursive nameservers in a cluster can be formed of hardware and/or software configured as described for domain name resolution. By way of non-limiting example, the various nameservers can include personal computers, servers, workstations, mainframes, etc.

Each of the recursive DNS nameservers in a cluster resolves requests for domain name information from other computing devices such as clients 312. Although two subscriber networks 310 with four clients 312 are shown, any number of subscriber networks or clients may be used. For example, a subscriber network may include a single client 312.

The nameservers 332 in cluster 330 include or are in communication with a local DNS cache 340 and subscriber database 350. While a single cluster is shown in FIG. 2, embodiments may include multiple clusters at various locations that share DNS, subscriber, and co-occurrence information as described. The domain name information stored in the cache can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information can include a packet, cell, message, or signal used to ask for domain name information.

The DNS cache 340 at each cluster facilitates more efficient responses to DNS requests by storing domain name information such as DNS records corresponding to previously received DNS requests. The cache may also store other domain name information, such as pre-fetched domain name information. If the cache contains the DNS record(s) needed to respond to a DNS request, the DNS nameserver can return the cached information without contacting other nameservers to fulfill the request. When DNS requests from client 312 or other computing devices cannot be fulfilled with cached domain name information, the recursive DNS cluster initiates recursive processing to determine the needed information. For example, a DNS nameserver 332 may first issue a DNS request to one of the root servers for generic top level domain information, followed by one or more DNS requests to various authoritative name servers to determine the requested domain name information.

A response can also include a packet, cell, message, or signal used for transmitting domain name information. A Uniform Resource Locator (URL) identifies resources available through network hosts. Some examples of URLs are http—HTTP resources, https—HTTP over SSL, ftp—File Transfer Protocol, mailto—E-mail address, ldap—Lightweight Directory Access Protocol lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URL includes domain names that form a portion of the URL.

In response to a DNS request for domain name information associated with a domain name, a recursive DNS nameserver within a cluster can determine a client identifier. A client identifier discriminates the sender, owner, user, or subscribing entity associated with the request for domain name information. Some examples of a client identifier are IP addresses, user id's, and secure tokens. If an IP address identifier is used, the recursive DNS nameserver can inspect the network packet containing the request to determine the source IP address of the packet. A username or secure token may be included in the request for domain information from which the recursive DNS nameserver determines the client identifier and the client information. In one example, a device or application on a subscriber's network is setup to modify DNS requests to include such identifiers.

In one example, the client identifier is a subscriber identifier and the client information is subscriber information. The client identifier can identify the entire subscriber network or an individual client within a subscriber network. A subscriber is generally an individual and/or entity that agrees to service conditions of an operator of a recursive DNS cluster 330. Subscribers may range from entities operating large networks 310, such as those provided by a wireless service providers or large corporations, to individuals having a home internet connection. It is noted that while subscriber networks 310 are depicted with multiple clients 312, that is not required. In a simple example, the subscriber may operate a single personal computer as a client with an internet connection.

The recursive DNS nameserver resolves a particular request for domain name information based on the subscriber information to generate a response. The recursive DNS nameserver returns the response to the client or a user associated with a client, providing the resolved domain name information in accordance with the subscriber information. By way of example, a substitute network (e.g., IP) address that satisfies a substitution criterion for the domain name in the request for domain name information may be obtained. The network and user records may specify one or more DNS resolution options, filters, features or other techniques for determining what IP address to resolve for a given domain name. For example, in providing DNS services to the DNS client, the DNS servers may provide resolved domain name information or redirect the DNS client to another location based on subscriber information stored at the DNS servers that indicates how an end user wants the DNS servers to employ the DNS resolutions options or features. In various examples, the DNS cluster may provide various DNS resolution options or features, such as misspelling redirection, parental filters, domain blocking, or phishing protection through the DNS process.

In some embodiments, a user or subscriber of a service provided by the DNS cluster may set one or more preferences or selections for how the options are to be enabled or otherwise applied when a DNS nameserver 332 resolves DNS queries associated with the user. Preferences or settings for a user or subscriber may be stored as subscriber information at subscriber database 350 or in one or more storage devices accessible to the DNS cluster 330. Upon identifying the user, subscriber information associated with the user may be used to alter the IP address in a DNS response that the user receives. For example, a user or subscriber may establish subscriber information that instructs the DNS nameserver to alter responses to DNS requests that are associated with malware, adult web sites, potential phishing or pharming sites, and other sites deemed inappropriate by the user or to which the user wishes to block or filter access, etc. In FIG. 2, the web server and nameserver utilize a single database but individual databases containing the same information may be used in other embodiments.

Network records may be included in subscriber database 350 that specify preferences or selections for resolving domain name queries associated with a particular subscriber's network 310. A subscriber may set permissions and preferences in network records to indicate that certain preferences can be bypassed by particular users of the subscriber's network. For example, an administrator for a corporate network 310 may set up network records to allow certain users of network 310 to bypass particular preferences in the network records, such as those blocking access to certain domains. Alternatively or additionally, permissions and preferences for overriding network preferences may be included in user records. User records can include subscriber information for individual users or entities using the services of DNS cluster 330. An individual user may specify resolution preferences or selections that will apply to individual DNS requests issued by the user. DNS nameserver 332 can use a subscriber identifier such as a userid, token or other identifier to determine a corresponding user record for a particular request. The user records and/or network records may be used by a block page service 362 in processing user resource requests. User records and network records may be used together to determine a set of permissions or preferences for applying to any individual request for domain name information, or requests for actual resources as will be explained hereinafter. For example, a user may set a preference in a user record allowing access to a certain category of domains, while a network record may indicate that users are not allowed to override the network preference set by the subscriber. In this manner, the nameservers 332 and/or block page service 362 operating as set forth below may use both types of records in responding to a resource request or DNS request. This permits a user to define a set of user preferences that can be applied when using different subscriber networks 310.

The domain name records in cache 340 may be associated with or have therein one or more flags. A flag can be any indicator, marking, or symbol associated with a domain name. For example a binary indicator stored in the domain name record can be used. A flag may be used to identify any type of information for a particular domain. For example, a flag may be used to mark a domain name as suspicious or untrustworthy, such as a site associated with malware or engaged in pharming or phishing activities. A flag may also indicate that a domain hosts illegal material, hate speech, pornography, material related to drugs or alcohol, or otherwise objectionable material that a subscriber does not wish to access or permit access to. Any number of flags can be used to create any number of categorizations for domain names. For example, flags denoting various levels of adult material may be used to classify domain according to their age-appropriateness. Different levels of security risks may be denoted by flags. Flags can also be set in domain name records to cause requests for a particular domain to be proxied. This can allow a subscriber to have traffic for certain domain names proxied, for example for logging, auditing and the like, while traffic for all other domains is not proxied.

When a request for domain name information is received, the DNS nameserver 332 resolves the domain name query using the subscriber information and any flags in the domain name record. For example, a network record for a DNS request may set a preference that a particular category of domains or a particular domain is to be blocked from access by devices on the network. If a DNS request is for a domain having a flag matching such a preference in the network record, the DNS nameserver may generate a DNS response with a substitute IP address that directs the client device to an alternate domain. In one example, the DNS nameserver provides the client device with domain name information associated with block page service 362 on web server 360. In response to the client device's resource request, the block page service can provide a block or landing page to the client device, for example, informing the user that the requested domain is not accessible on their network. The block or landing page refers generally to any resource or information provided by the block page service in response to a request for a target domain that is not an actual resource provided by the target domain.

A co-occurrence or C-rank engine 372 is configured on an application server 370 that generates co-occurrence information for domains 322 to facilitate domain classification. The C-rank engine may additionally generate flags or other domain identifying information based on the co-occurrence information. The co-occurrence and optionally the domain classifications are maintained in C-rank database 352. The domain classifications can be used to generate flags associated with the domain name records in DNS cache 340 in one example. In this manner, the DNS nameserver 332 can respond to client DNS requests using domain classifications generated by the C-rank engine. For example, the C-rank engine may generate domain co-occurrence information for database 352. Using the co-occurrence information, particular domains may be determined to be associated with malware or some other classification of domains. The C-rank engine or other component can update DNS cache or other information with a flag indicating that the domain is associated with malware or some other classification. DNS or resource-level requests can be processed using the flags and subscriber information to generate DNS information or resources for the domain. This may include providing a block or landing page or DNS information for such a page in response to a client request.

Subscriber database 350 includes a log reflecting client DNS request behavior. The log includes a record of each DNS request received by a nameserver 332 from a client 312. The log can include a client identifier such as the source IP address of each request, a domain identifier such as the target domain or host name of the request, and time information associated with the request.

C-rank engine 372 generates co-occurrence information and domain classifications using the log of client DNS requests from subscriber database 350 in one embodiment. The C-rank engine utilizes the request behavior of each client to generate co-occurrence information representing the relatedness of unknown domains to already classified domains. The request behavior can also be used to generate or update a domain classification for domains having an existing classification. For example, the DNS cluster may process DNS requests from a plurality of clients for a plurality of domains including known domains having a classification and unknown domains having no classification. The classification of known domains may be used to generate co-occurrence information representing co-occurrences of requests for the unknown domains and requests for an already classified domain. Based on the requests of clients associated with an unknown domain and one or more known domains, co-occurrence information can be generated. The C-rank engine may optionally classify the unknown domain based on the co-occurrence information. The co-occurrence information and/or classification can be used to generate one or more flags for a corresponding domain name record in the DNS cache 340 in one example.

The C-rank engine may alternately or additionally generate co-occurrence information and domain classifications using a log of client request behavior associated with block page service 362. This log can be maintained in subscriber database and also sets forth a correlation between domain and clients. Although principally described as responding to redirections from nameserver 332 away from blocked domains, etc., the block page service 362 can also operate independently of any domain name system services provided by the cluster. In one embodiment, for example, client requests for domains 322 may simply be proxied by the block page service. The information can be tracked similarly to the DNS information to generate co-occurrence information and domain classifications.

Figure 3:
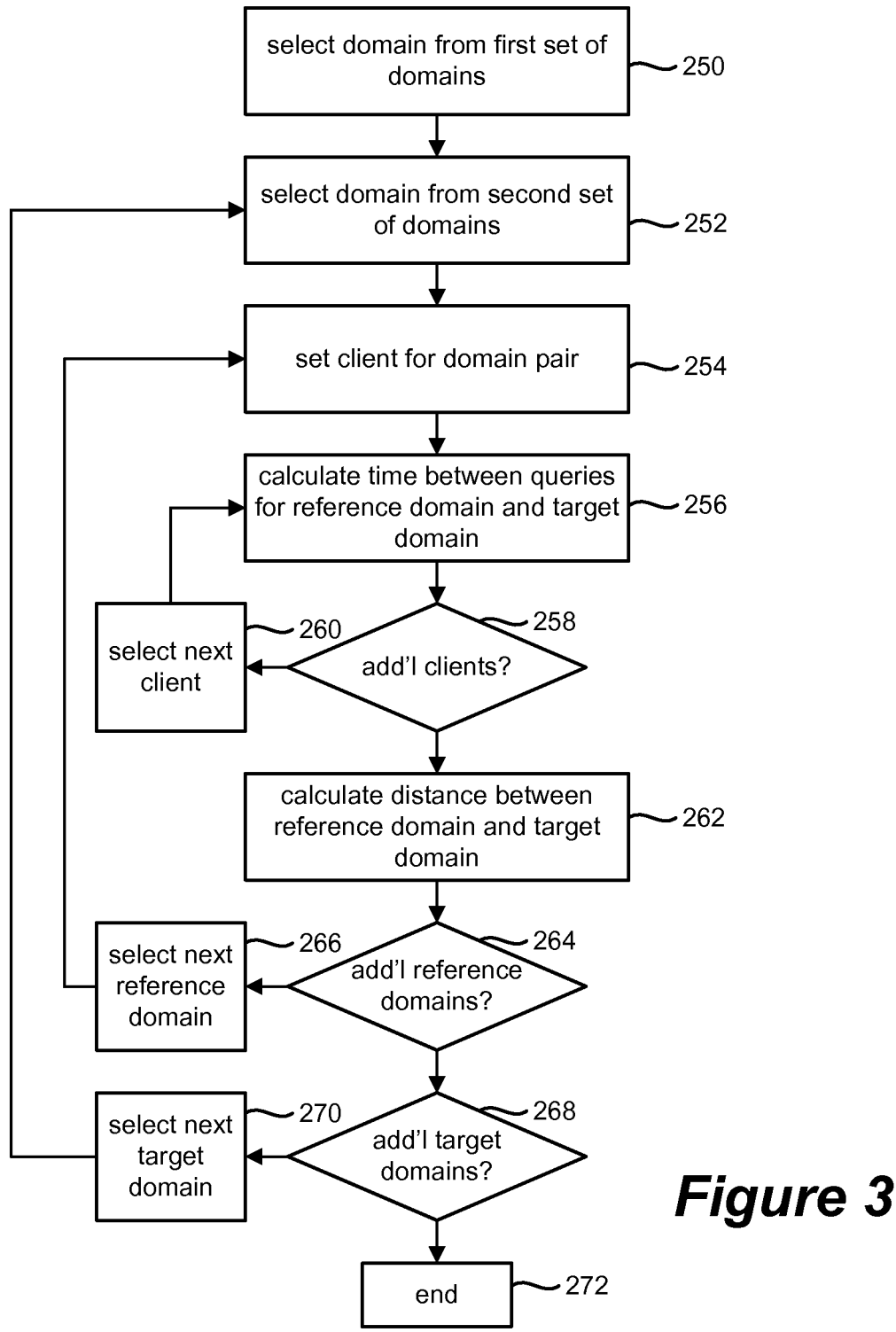
FIG. 3 is a flowchart describing a method of generating distance information for domain pairs in accordance with one embodiment.

FIG. 3 is a flowchart describing a process for generating distance information for domain pairs in accordance with one embodiment. The process of FIG. 3 can be used at step 206 of FIG. 1 in one example. In FIG. 3, the system determines distance information for a first set of domains relative to a second set of domains. Although not shown, the system may additionally determine distance information for domain pairs within the first set and/or the second set of domains.

At step 250, the C-rank engine selects a first domain from the first set of domains. At step 252, the C-rank engine selects a first domain from the second set of domains. The result of steps 250 and 252 is a domain pair comprising one domain from the first set and one domain from the second set. For ease of explanation, reference may be made to the domain from the first set as a target domain and the domain from the second set as a reference domain. For example, reference may be made to determining a co-occurrence or distance of a target domain relative to a reference domain such as a malicious domain.

At step 254, the C-rank engine selects a first client id from the set of clients. The first client may be a first client from the set of clients that has issued a request for both the target domain and reference domain. At step 256, the C-rank engine determines time information associated with the domain pair for the selected client. In one example, step 256 includes determining a difference in time between the client's request for the reference domain and the client's request for the target domain. After determining the client time information for the domain pair, the C-rank engine determines whether there are additional clients that have issued a request for each domain of the pair. If there is an additional client for the domain pair, the C-rank engine selects the next client at step 260. The C-rank engine then continues processing by determining time information for the next client at step 256.

After calculating time information for each client id associated with the domain pair, the C-rank engine determines distance information for the selected domain pair including the domain from the first set and the domain from the second set at 262. In one embodiment, the C-rank engine combines the time information of each client for the domain pair to generate the distance information for the domain pair. Equation 1 sets forth a technique for determining a distance between two domains for a single client in one embodiment.

$$g(i, j) = \frac{1}{\sqrt{1 + \alpha(|t_i - t_j|)}} \quad \text{Equation 1}$$

Equation 1 sets forth a distance score g(i, j) for a domain i from the first set of domains and a domain j from the second set of domains. The distance is based on the difference between a time $t_i$ for a request from the client for the target domain i and a time $t_j$ for a request from the client for the reference domain j. In this example, the absolute value of the time difference is taken and then adjusted by a constant $\alpha$. The result is added with 1 and the square root of that result is taken. The quotient of 1 and the square root provides the distance of the client for the domain pair.

Equation 2 sets forth a technique for determining a distance between two domains for a set of clients C.

$$g(i, j) = \sum_{c \in C} \frac{1}{\sqrt{1 + \alpha(|t_i(c) - t_j(c)|)}} \quad \text{Equation 2}$$

In Equation 2, the distance between the two domains of the domain pair (i, j) for each client in a set of clients C is combined to generate a combined distance for the domain pair. The time information $t_i(c)$ and $t_j(c)$ for a particular client c is used to calculate a distance between the two domains as shown in equation 1. A summation of the distance for every client c in a set of clients C issuing a request for both domains is taken.

Equation 3 sets forth a refined distance score s(i, j) for a domain pair including a domain i and a domain j.

$$s(i, j) = \frac{g(i, j)}{\sum_{k \in D} g(k, j)} \quad \text{Equation 3}$$

In Equation 3, the distance g(i, j) for the domain pair is combined with a distance score of the reference domain j over a set of all domains D associated with a particular client c. A summation of the distance for each domain pair made up of a domain k in the set of domains D and the target domain is taken. In equation 3, a large distance measurement g(i, j) is divided by the sum of the distance measurement for the reference domain j with all domains in the set D. Thus, if the reference domain co-occurs with many domains, the distance score s(i, j) will be low. Equation 3 can be normalized as shown in equation 4 in one embodiment.

$$s'(i, j) = \frac{s(i, j)}{\sum_{k \in D} s(i, k)} \quad \text{Equation 4}$$

In equation 4 a normalized distance score s' for a domain pair (i, j) is generated by dividing the distance score s by the summation of the distance score for the target domain i across all domains k in the set of domains D. The normalization can provide a summation of s'(i,j) that is equal to one for all domains j in the set of domains D.

After calculating a distance between the domains of the domain pair across the set of clients, the C-rank engine checks at step 264 whether there are additional reference domains for comparison against the target domain. If additional reference domains exist in the second set of domains, the C-rank engine selects the next reference domain at step 266. The C-rank engine then selects the first client for the new domain pair at step 254. Processing then continues for the new domain pair as earlier described at steps 256-260.

Once all reference domains in the second set of domains have been compared to the selected target domain as determined at step 264, the C-rank engine determines whether additional target domains exist in the first set of domains. If there are additional target domains, the C-rank engine selects the next target domain at step 270 and proceeds to step 252. At step 252, the reference domain is reset to the first reference domain. Processing then continues at steps 254-270 as described above. Once all target domains have been compared against all reference domains as determined at step 270, the process for determining distance information ends at step 272.

Equation 5 sets forth a technique for determining co-occurrence information in one embodiment as can be used at step 208 of FIG. 1 in one example.

$$Cr(i) = \frac{\sum_{j \in M} s'(j, i)}{\sum_{k \in D} s'(k, i)} \quad \text{Equation 5}$$

In equation 5, a co-occurrence score Cr for a particular domain i from the first set of domains is calculated. In this example, a first summation is taken based on the distance scores for the selected target domain i. The distance score for each domain pair including the selected target domain i and a reference domain j from the second set of reference domains M is selected. The sum of the distance score for each domain pair including the selected target domain is taken as shown in the numerator of equation 5. In this manner, the co-occurrence score for a selected domain is based on its distance from all domains in the reference set of domains, as computed across a set of clients.

In equation 5, the co-occurrence score is also based on the distance scores for a target domain i across all domains in the plurality of domains D. Specifically, the summation in the numerator of equation 5 is divided by a summation of the distance scores for the target domain i across each domain k in the plurality of all domains D.

Equations 6 and 7 set forth a technique for determining a co-occurrence measure for each domain i in one example.

$$h(i) = |\{k : k \in M \wedge s'(i, k) > 0\}_i| \quad \text{Equation 6}$$

$$Cr(i) = \frac{\sum_{j \in M} s'(i, j) \cdot \log(h(i))}{\sum_{j \in D} s'(i, j) \cdot \max(\log \cdot h)} \quad \text{Equation 7}$$

Figure 4:
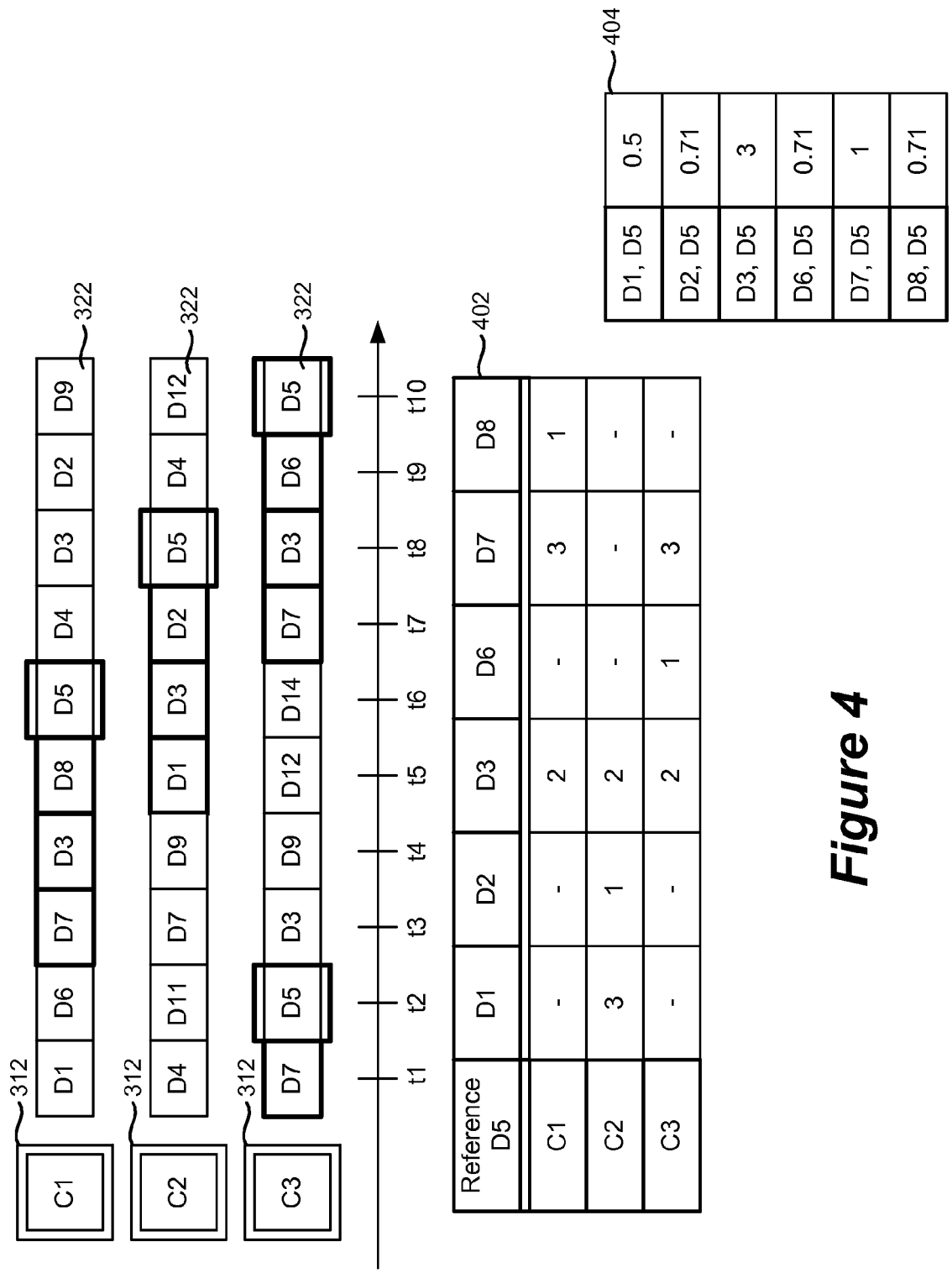
FIG. 4 is a block diagram illustrating sequences of domains and the identification of domain co-occurrences in accordance with one embodiment.

FIG. 4 is a block diagram depicting an example of the determination of distance information for a set of domains relative to a reference domain. FIG. 4 depicts a sequence of domains 322 associated with three clients 312. In the specific example, three clients C1, C2 and C3 are depicted. For each client, a sequence of domains is shown along the y-axis representing time. Each domain corresponds to one DNS (or resource) request received from the client at a corresponding time represented along the y-axis. For example, client C1 issues a request for domain D1 at time t1, a request for domain D6 at time t2, etc. In the simplified example, it is assumed that one second exists between each denoted time.

In this example, domain D5 is a reference domain. For example, domain D5 may be on a block list or in some manner determined to be associated with malware or other suspicious activity. The system determines distance, and ultimately co-occurrence information to determine whether other domains may be related to reference domain D5, and thus also associated with suspicious activity. In this specific example, the system only examines for each client, domains that are requested within 3 seconds of the target domain. Further, the system only examines domains that are requested before the target domain. For client C1, the system determines that domains D7, D3 and D8 co-occur with the target domain D5. For client C2, the system determines that domains D2, D3 and D1 co-occur with the target domain. For client C3, the system determines that domains D6, D3, and D7 co-occur with the target domain.

Table 402 sets forth distance information that is calculated for the domain pairs formed from reference domain D5 and the set of domains determined to co-occur with the reference domain. The distance information in table 402 sets forth the information for individual clients. For each client, the table includes the distance between the reference domain D5 and each of the domains co-occurring with the reference domain for that client. For client C1, domains D7, D3 and D8 were determined to co-occur with domain D5. Accordingly, the entries for domains D1, D2 and D6 are null, indicating no co-occurrence. For the remaining domains, the table sets forth the distance between the target domain and the co-occurring domain. In this example, the distance is based on the difference in time between the request for the target domain and the request for the co-occurring domain. Accordingly, the distance between domain D3 and D5 for client C1 is equal to two, or the difference between (t5 and t3). For domain D7, the distance is 3 and for domain D8 the distance is 1. Corresponding values are set forth in the table for clients C2 and C3. For client C3, which has two co-occurrences for domain D7 with D5, the more recent co-occurrence is selected. In other example, more than one co-occurrence can be used, or different techniques for selecting which co-occurrence(s) to select can be used.

Table 404 sets forth the distance information for the domain pairs created by the target domain D5 and the co-occurring domains associated with clients C1, C2 and C3. In this example, the distance between the target domain and the reference domain for each domain pair is based on the sum of the distance for each client. Accordingly, the table sets forth a summation of the distances for each domain pair across clients C1, C2, and C3. In this case, the summation is taken as set forth in Equation 1. Accordingly, a domain with a smaller distance score is considered to be further away from or to have a smaller co-occurrence with the target domain. A domain with a larger distance score is considered to be closer to or to have a larger co-occurrence with the target domain.

Figure 5:
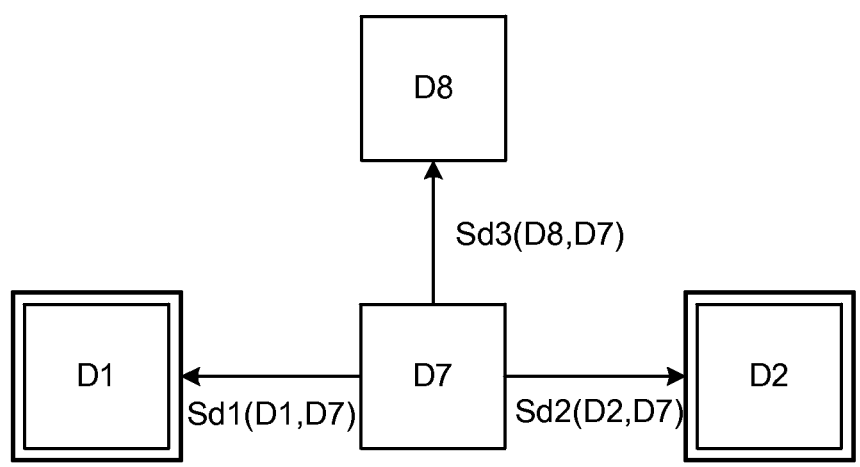
FIG. 5 is a block diagram illustrating the generation of co-occurrence information based on domain pair distance information in accordance with one embodiment.

FIG. 5 is a block diagram depicting an example of determining co-occurrence information for a target domain across a set of reference domains. Four domains are depicted including domain D1, domain D7, domain D2 and domain D8. In this example, domain D1 and domain D2 are both reference domains while domains D7 and D8 are target domains. For example, domains D1 and D2 may appear on a block list of malicious domains and domains D7 and D8 may be unclassified. FIG. 5 illustrates that domain pair (D1, D7) has a first distance score Sd1 based on co-occurrences between domains D1 and D7 across a set of clients. Domain pair (D2, D7) has a second distance score Sd2 based on co-occurrences between domains D2 and D7 across the set of clients. FIG. 5 also illustrates that a distance score can be calculated for a domain pair including two target domains (or two reference domains). FIG. 5 depicts a third distance score Sd3 based on co-occurrences between target domains D8 and D7. The distance between two target domains or two reference domains may be used as described herein.

In FIG. 5, co-occurrence information for a target domain is determined from a combination of the distance scores of domain pairs including the target domain and any of the reference domains. For domain D7, a co-occurrence score is determined by combining the distance score for the domain pair (D1, D7) and the domain pair (D2, D7). Specifically, the co-occurrence score in FIG. 5 is based on a summation of the distance scores for the domain pairs as well as a summation of the distance scores for the target domain co-occurrences with all domains. Accordingly in this example, the summation of the distance scores for the domains pairs (D1, D7), (D2, D7), as well as (D8, D7) is taken. The final co-occurrence score is then obtained by combining the summation of the distance scores across reference domains with the summation of the distance scores across all domains.

Figure 6:
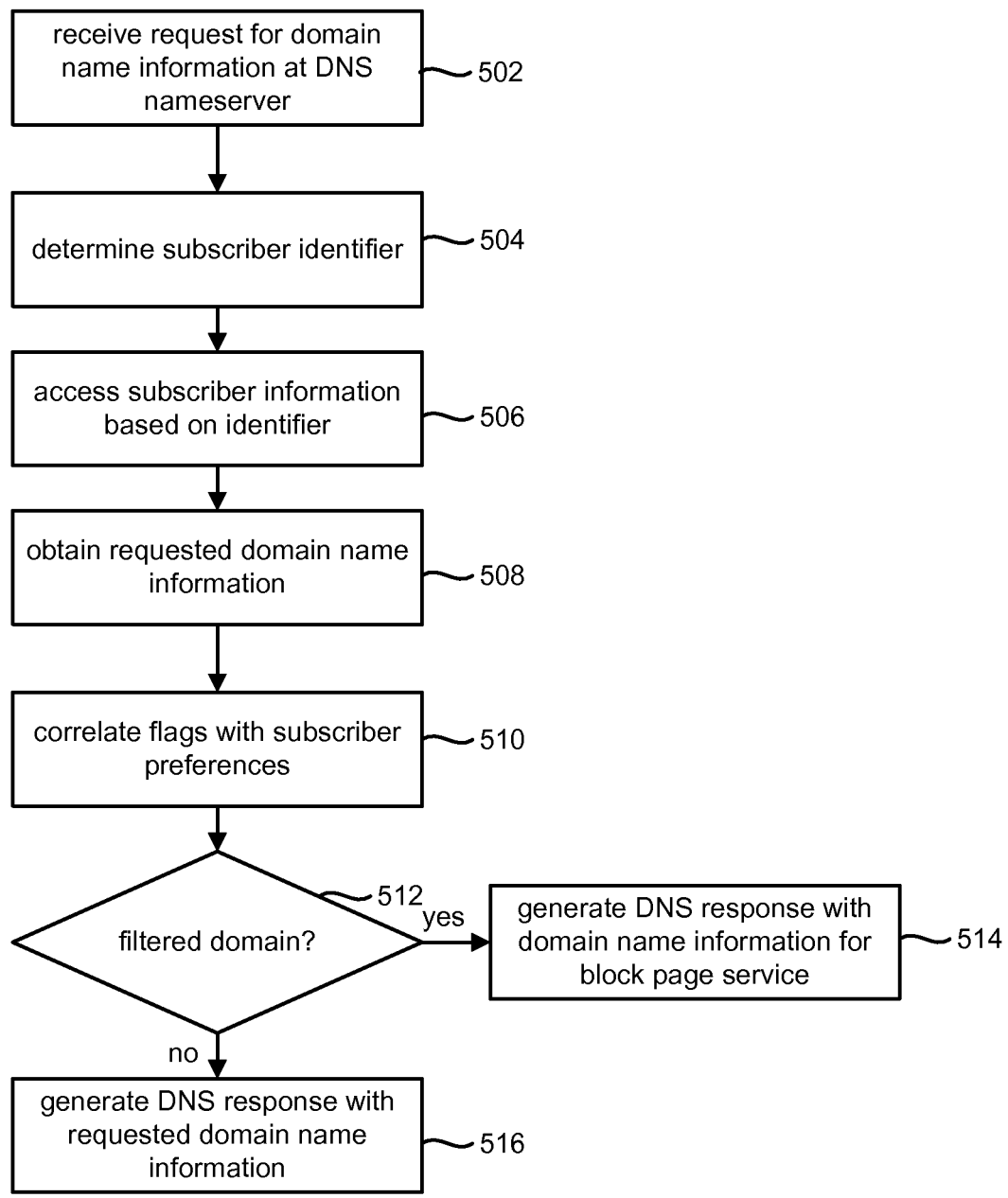
FIG. 6 is a flowchart describing a method of processing a DNS request based on domain co-occurrence information in accordance with one embodiment.

FIG. 6 is a flowchart describing a method of processing domain name requests by a recursive DNS cluster in accordance with one embodiment. In one embodiment, FIG. 6 includes using the domain classifications generated at step 210 of FIG. 1. At step 502, a DNS nameserver 332 receives a request for domain name information from a client device 312. In this example, it is assumed that the client device 312 is part of a subscriber network, and thus, that a unique IP address distinguishing the client device from another client device cannot be obtained. At step 504, the DNS nameserver determines a subscriber identifier associated with the DNS request. In one example, the DNS nameserver parses the DNS request for the source IP address which is used as the subscriber identifier. At step 506, the DNS nameserver uses the subscriber identifier to obtain a corresponding network record from database 350. At step 508, the DNS nameserver obtains the requested domain name information. Step 508 may include determining the domain in the request for domain name information and checking cache 340 for a domain name record corresponding to the requested domain. If the cache contains a domain name record for the requested domain and the record is not expired, the DNS nameserver obtains the cached domain name record. If the cache does not contain a domain name record for the requested domain or if the domain name record is expired, the DNS nameserver attempts to retrieve the domain name information using one or more authoritative and/or root DNS nameservers.

After obtaining the domain name information, the DNS nameserver determines whether there are any flags associated with the requested domain and if so, correlates the flags with the preferences in the network record 352 at step 510. Step 510 can include determining if the domain information includes a flag indicating that a domain is associated with malware as determined by C-rank engine 372 in one embodiment. Step 510 includes determining whether the domain name information for the requested domain includes any identifiers corresponding to preferences in the subscriber information. For example, step 510 may include determining an age-rating for the domain and comparing that with an age-rating preference in the subscriber information record. Step 510 may also apply system wide preferences, for example for block listed domains or domains otherwise associated with malware. In this instance, the system will generate a response for the block page service in response to all requests for such a domain. In other examples, a subscriber may choose to override or otherwise not have these system wide preferences applied.

If any of the flags correlate to preferences in the network record, the DNS nameserver determines if any of the flags and corresponding network preferences indicate that the traffic to the domain should be filtered at step 512. In one embodiment, step 512 includes determining whether the network records indicate that the requested domain should be blocked for requests from the subscriber's network. Step 512 may also include determining whether the records indicate that traffic for the requested domain should be proxied, but access still allowed.

If the domain name information contains a flag indicating that the requested domain should be proxied or blocked, the DNS nameserver issues a DNS response at step 514 with domain name information for the block page service 336 at web server 334. If the domain is not to be blocked or proxied for the subscriber's network, the DNS nameserver issues a DNS response at step 516 with domain name information for the requested domain.

Figure 7:
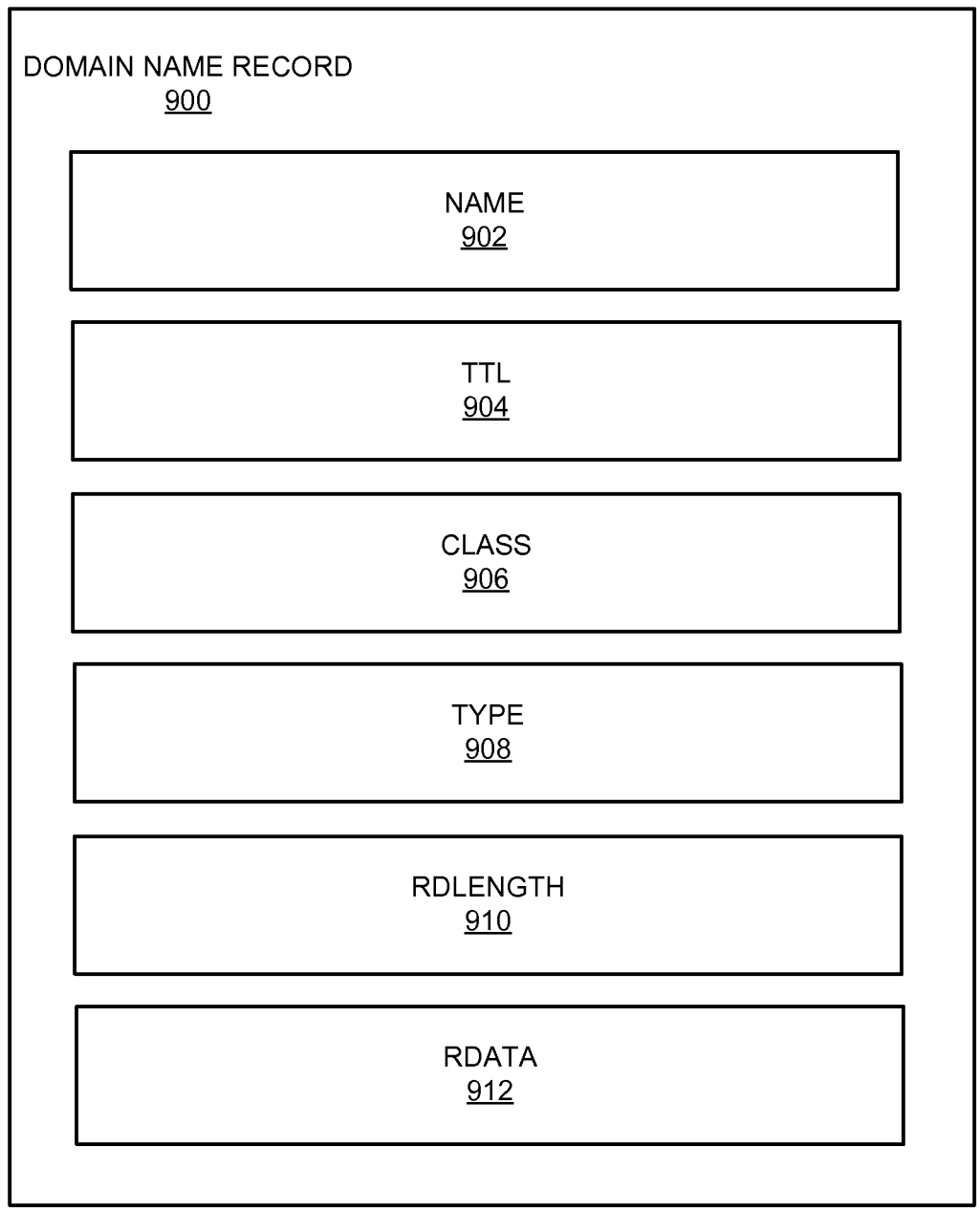
FIG. 7 depicts the structure of an example of a DNS resource record.

FIG. 7 is a block diagram depicting the structure of a domain name resource record that can be stored in the local cache at the recursive DNS clusters. Each resource record includes a name field 902, a TTL field 904, a class field 906, a type field 908, an RDLENGTH field 910 and an RDATA field 912. As earlier described, the TTL field sets the maximum amount of time for maintaining the resource record before it should be treated as invalid and expired. In accordance with one embodiment, the RDATA field is used for various flags that may be set by the recursive nameservers to indicate some additional information about the domain in addition to the standard DNS specified information. A flag can be any indicator, marking or symbol associated with a domain name, such as a binary indicator in part of the RDATA field. The flags may have various functions, including but not limited to marking domain names as suspicious or untrustworthy, such as a web site associated with phishing activities. Flags may be used to indicate various types and levels of information. For information, social networking or pornographic web pages may be flagged so that the nameserver can provide alternate or additional information when a client issues a request.

Figure 8:
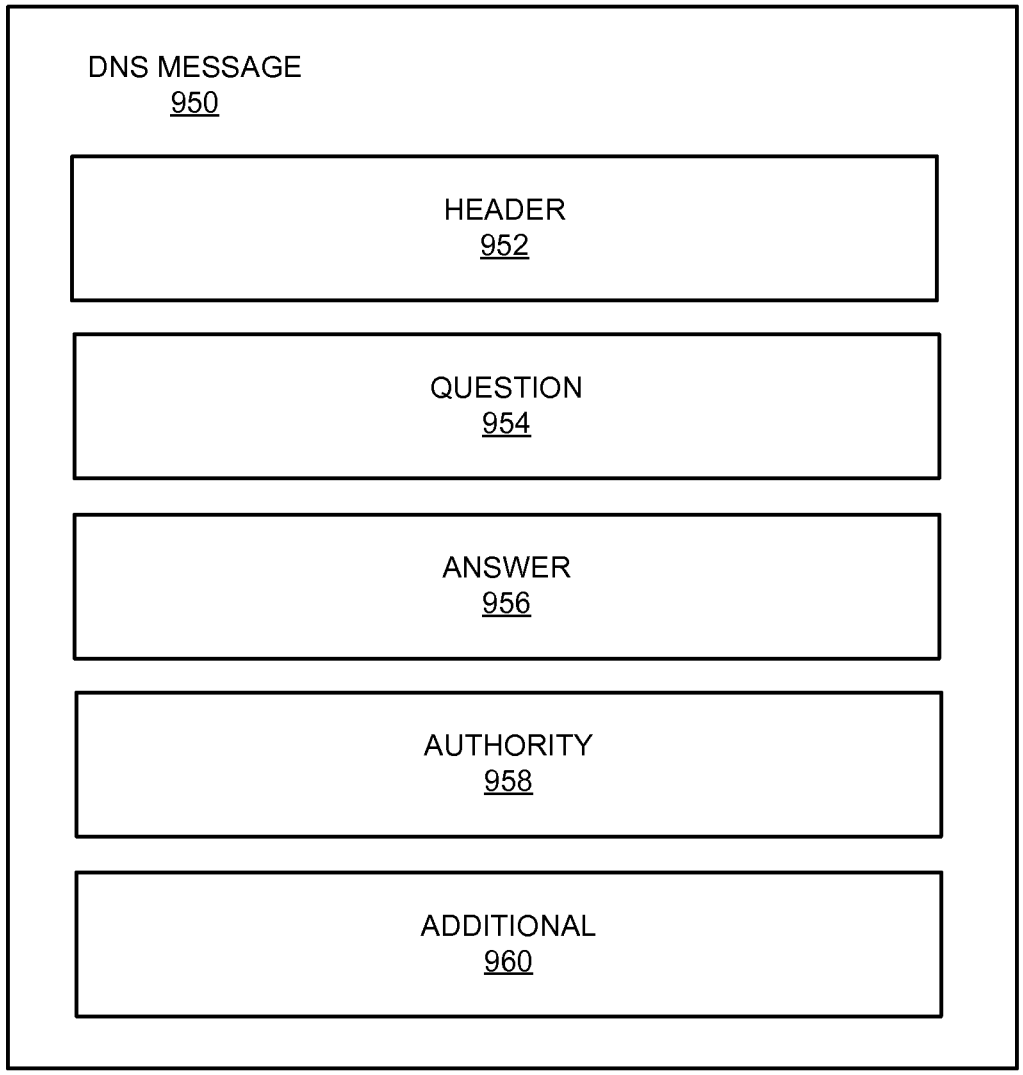
FIG. 8 depicts the structure of an example of a DNS message.

FIG. 8 is a block diagram depicting the structure of a DNS message response or request 950. A DNS message includes a header field 952, a question field 954, an answer field 956, an authority field 958 and an additional field 960. The question field indicates the question for (or request) of the name server in a DNS request. The answer field in a DNS response includes one or more resource records answering a question from a DNS request. The authority field includes one or more resource records pointing to an authority. The additional field is structured like a resource record and can include various types of information, such as the subscriber identifier as described above.

Figure 9:
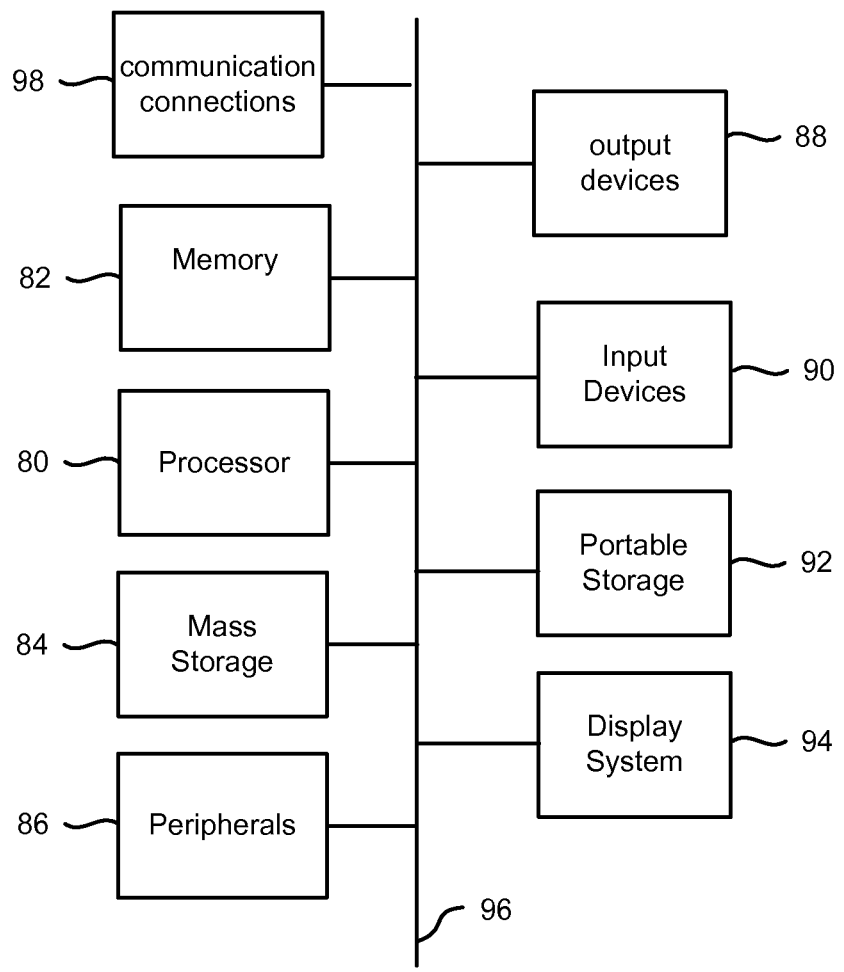
FIG. 9 is a simplified block diagram of a computing device that can be used to implement various embodiments of the disclosed technology.

FIG. 9 is a high level block diagram of a computing system which can be used to implement any of the computing devices of FIG. 3. The computing system of FIG. 9 includes processor 80, memory 82, mass storage device 84, peripherals 86, output devices 88, input devices 90, portable storage 92, and display system 94. For purposes of simplicity, the components shown in FIG. 0 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 10. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 9 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 9 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein, including the C-rank engine, can be implemented using hardware, software, or a combination of both hardware and software. The software used is stored on one or more of the processor readable storage devices described above (e.g, memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of processing communication in a computer network, comprising:
  accessing information related to requests from a plurality of clients for a plurality of domains, the information including for each client a list of domains associated with requests from the client;
  generating distance information based on requests for domains in a first set of the plurality of domains and requests for domains in a second set of the plurality of domains, wherein the distance information includes information for domain pairs based on requests for one domain from the first set and requests for one domain from the second set;
  for each domain in the first set of domains, generating co-occurrence information based on the distance information for each domain pair including said each domain; and
  generating a domain classification for the first set of domains based on the co-occurrence information;
  wherein generating distance information includes, for each domain pair, determining time difference information for each client that is associated with the domain pair, the time difference information being based on requests from said each client for the one domain from the first set and the one domain from the second set.

2. A method according to claim 1, wherein generating distance information includes, for each domain pair:
combining the time difference information for each client to generate a distance score for each domain pair.

3. A method according to claim 2, wherein generating co-occurrence information includes, for each domain in the first set of domains:
combining the distance score for each domain pair including said each domain to create a co-occurrence score for said each domain in the first set of domains.

4. A method according to claim 3, wherein generating distance information includes:
generating a distance score for domain pairs including a first domain from the first set and a second domain from the first set.

5. A method according to claim 4, wherein generating co-occurrence information further includes, for each domain in the first set of domains:
using the distance score for domain pairs including said each domain and another domain from the first set of domains in combination with the distance score for domain pairs including said each domain and a domain in the second set of domains to create the co-occurrence score for said each domain.

6. A method according to claim 1, further comprising:
receiving a plurality of domain name system (DNS) requests from the plurality of clients for the plurality of domains; and
generating a plurality of DNS replies for the plurality of DNS requests based on the domain classification for the first set of domains.

7. A method according to claim 6, wherein generating a domain classification for the first set of domains comprises:
determining for each domain in the first set of domains whether the co-occurrence information for the each domain indicates an association with malware; and
updating domain name information for a first domain in the first set of domains having co-occurrence information indicating an association with malware.

8. A method according to claim 7, wherein:
the plurality of DNS requests includes a first DNS request for domain name information associated with the first domain; and
generating the plurality of DNS replies includes generating a first DNS reply for the first DNS request including domain name information associated with an alternate domain in response to the domain name information for the first domain.

9. A method according to claim 8, wherein:
the domain name information for the alternate domain is associated with a block page service.

10. A method according to claim 1, further comprising:
receiving a plurality of resource requests from the plurality of clients, the plurality of resource requests being associated with the plurality of domains; and
generating a plurality of replies for the plurality of resource requests based on the domain classification for the second set of the plurality of domains.

11. A method according to claim 1, further comprising:
iteratively generating the co-occurrence information for the first set of domains, wherein iteratively generating the co-occurrence information includes removing domains from the first set of domains and adding domains removed from the first set to the second set of domains.

12. A method according to claim 1, wherein:
the second set of domains are suspicious domains;
generating a domain classification for the first set of domains includes indicating that one or more domains in the first set are suspicious domains.

13. A computer readable storage medium having computer readable instructions for programming a processor to perform a method of domain classification, the method comprising:
accessing information related to requests from a plurality of clients for a plurality of domains, the information including for each client a set of domains associated with requests from the client;
generating distance information based on requests for the plurality of domains from the plurality of clients, wherein the distance information includes information for domain pairs from the plurality of domains;
for each domain in a first set of domains, generating co-occurrence information based on the distance information for at least a subset of domain pairs including said each domain; and
generating a domain classification for the first set of domains based on the co-occurrence information;
wherein generating distance information includes, for each domain pair, determining time difference information for each client that is associated with the domain pair, the time difference information being based on requests from said each client for one domain from the first set and one domain from a second set of domains.

14. A computer readable storage medium according to claim 13, wherein generating distance information includes, for each domain pair:
combining the time difference information for each client to generate a distance score for each domain pair.

15. A computer readable storage medium according to claim 14, wherein generating co-occurrence information includes, for each domain in the first set of domains:
combining the distance score for each domain pair including said each domain to create a co-occurrence score for said each domain in the first set of domains.

16. A computer readable storage medium according to claim 15, wherein generating distance information includes:
generating a distance score for domain pairs including a first domain from the first set and a second domain from the first set.

17. A computer readable storage medium according to claim 16, wherein generating co-occurrence information further includes, for each domain in the first set of domains:
using the distance score for domain pairs including said each domain and another domain from the first set of domains in combination with the distance score for domain pairs including said each domain and a domain in the second set of domains to create the co-occurrence score for said each domain.

18. A system for generating domain information, comprising:
at least one storage device including information related to requests from a plurality of clients for a plurality of domains, the information including for each client a list of domains associated with requests from the client;
a processor in communication with the at least one storage device, the processor executes computer readable instructions to generate distance information based on requests for the plurality of domains from the plurality of clients, wherein the distance information includes information for domain pairs, the processor generates, for each domain in a first set of the plurality of domains, co-occurrence information based on the distance information for each domain pair including said each domain and generates a domain classification for the first set of domains based on the co-occurrence information, the processor is configured to generate the distance information by determining time difference information for each client that is associated with the domain pair, the time difference information being based on requests from said each client for one domain from the first set and one domain from a second set of domains.

19. A system for generating domain information according to claim 18, wherein the processor generates distance information by:
combining the time difference information for each client to generate a distance score for each domain pair.

20. A system for generating domain information according to claim 19, wherein the processor generates co-occurrence information for each domain in the first set of domains by:
combining the distance score for each domain pair including said each domain to create a co-occurrence score for said each domain in the first set of domains.

21. A method according to claim 1, wherein the requests from the plurality of clients includes a plurality of first requests, the method further comprising:
routing the plurality of first requests from the plurality of clients;
generating the information related to the plurality of first requests based on the routing;
receiving a second request from at least one of the clients; and
routing the second request based on the domain classification.

22. A computer readable storage medium according to claim 13, wherein the requests from the plurality of clients includes a plurality of first requests, the method further comprising:
routing the plurality of first requests from the plurality of clients;
generating the information related to the plurality of first requests based on the routing;
receiving a second request from at least one of the clients; and
routing the second request based on the domain classification.

23. A method according to claim 22, wherein:
the second request is a second DNS request; and
routing the second DNS request comprises generating a DNS reply for the second DNS request based on the domain classification for the first set of domains.

24. A system for generating domain information according to claim 18, wherein:
the processor is configured to receive a plurality of domain name system (DNS) requests from the plurality of clients for the plurality of domains and generate a plurality of DNS replies for the plurality of DNS requests based on the domain classification for the first set of domains.

* * * * *